June 3, 1969  J. P. THOREL ET AL  3,448,303
LINEAR MOTOR STRUCTURE
Filed Feb. 8, 1965  Sheet 1 of 2

INVENTORS
John P. Thorel, Chia Huan Lee
& Donald G. Sherwood
BY Zigmund L. Hermer
ATTORNEY

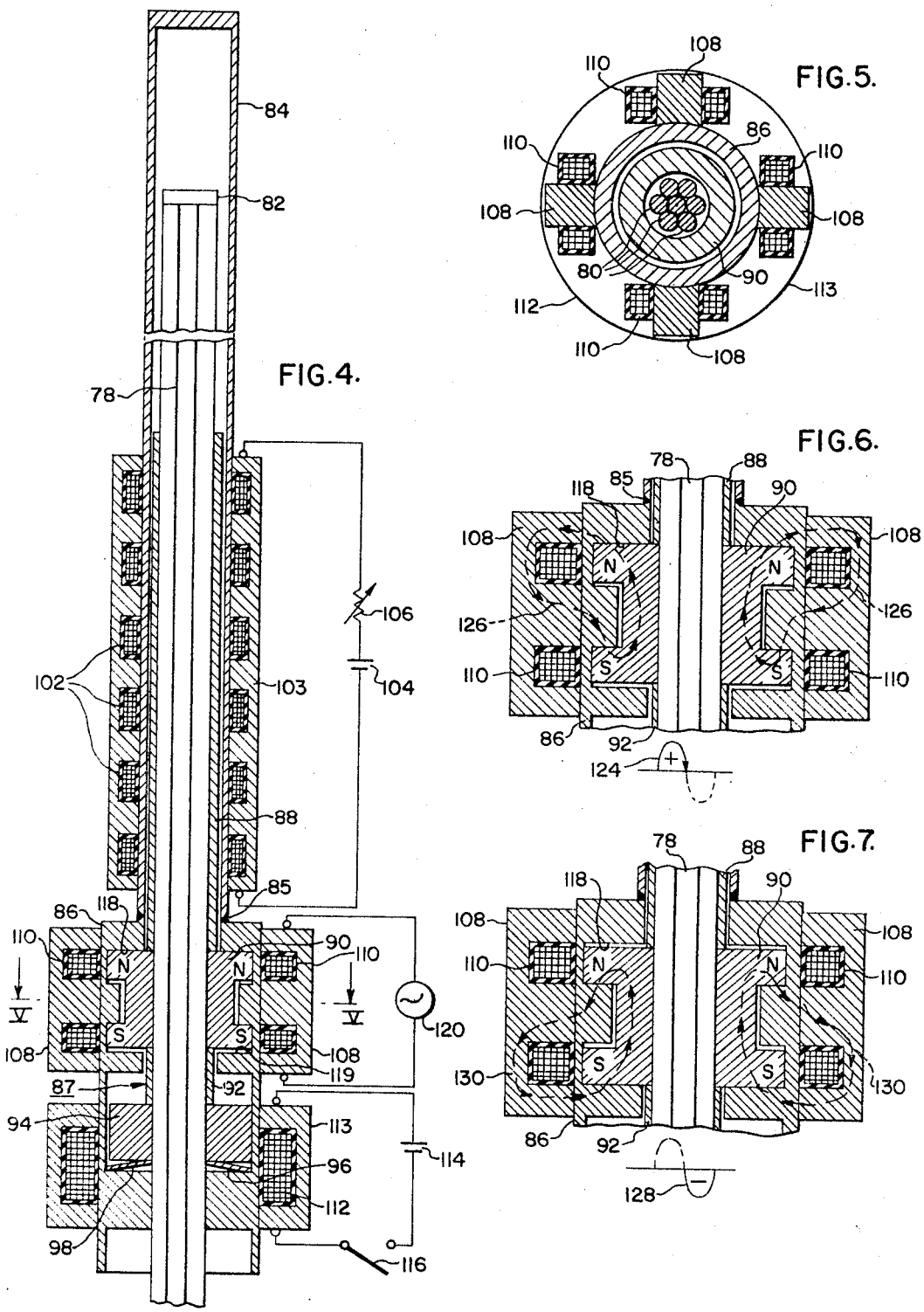

United States Patent Office 3,448,303
Patented June 3, 1969

3,448,303
LINEAR MOTOR STRUCTURE
John P. Thorel, Northridge, and Chia Huan Lee, Torrance, Calif., and Donald G. Sherwood, Squirrel Hill, Pittsburgh, Pa., assignors to Westinghouse Electric Corporation, East Pittsburgh, Pa., a corporation of Pennsylvania
Filed Feb. 8, 1965, Ser. No. 431,026
Int. Cl. H02h 41/02
U.S. Cl. 310—14        15 Claims This invention relates to linear motion devices, and more particularly to apparatus for actuating a linear element by means of inertial forces.

Although not limited thereto, the present invention is particularly adapted for use in atomic reactors and the like wherein a number of control rods are moved within the reactor vessel by linear motion devices in order to control the chain reaction developed in the core of the reactor. Such linear motion devices also have utility in actuating various elements and mechanisms along straight-line paths; and it should, therefore, be understood that the specific reference hereinafter made to atomic reactors is for purposes of illustration only and that the invention has other and different applications.

In the past, linear motion devices have been proposed in which a plurality of electromagnetic coils are mounted in a manner to secure by magnetic attraction a linear element passing through the coils. Some of the coils are utilized in combination with mechanical gripping devices to secure the element to a fixed member, while other coils are employed to secure the element to a movable member. The movable member, in turn, is moved in either direction of a straight-line path of travel by a pair of additional or displacement coils.

Two general types of linear motion devices have heretofore been employed. The first of these utilizes a grooved rod or linear element with magnetically actuated latches which positively grip the rod while it advances through successive indexing steps. The second type of linear motion device, on the other hand, relies on magnetically induced radial expansion of a flexible rod bundle against the bore of a movable plunger and the use of a similar "hold" device for maintaining the rod bundle in position.

The present invention is concerned with the second type of linear motion device described above; and it is an object of the invention to provide such a linear motion device in which the linear element, comprising a rod bundle, is moved by means of inertial forces.

Another object of this invention is to provide a linear motion device wherein only one gripper element is required to obtain incremental, bidirectional linear motion.

A further object of this invention is to provide a linear motion device for obtaining incremental linear motion wherein the power supply for operating the device can be greatly simplified.

Another and more specific object of the invention is to provide a linear motion device in which a permanent magnet, in combination with electromagnetic coil means, is utilized to actuate a linear motion element along a straight-line path of travel.

In accordance with the invention, a linear motion device is provided including a linear element of the type comprising a bundle of rods of magnetically permeable material which can be expanded radially outwardly under the influence of a magnetic field, a cylindrical linear actuating device surrounding the linear element and movable along the axis of the linear element between stationary abutments, resilient means interposed between at least one of the stationary abutments and an end of the actuating device for urging the actuating device into a predetermined null position, gripper coil means surrounding the linear actuating device for expanding the rods of the linear element radially outwardly into frictional engagement with the inner periphery of the cylindrical actuating device, and means for selectively driving the actuating device into one or the other of said abutments whereby the inertia of the linear element will cause it to slide within the actuating device and effect a net incremental movement along its axis when the actuating device is returned to its null position by the aforesaid resilient means.

In one embodiment of the invention, the device consists of three coils or coil groups, depending upon the weight of the linear element, a spring-loaded movable gripper, and a magnetic circuit including two pole pieces. Linear motion is imparted to a magnetically expanded rod bundle, centrally located and passing through the movable gripper, by the inertial slip created in the direction of motion between the movable gripper and the rod bundle when the movable gripper slams against the pole pieces of the magnetic circuit.

In another embodiment of the invention, a movable gripper is again provided which holds the rod bundle with frictional forces. In this case, however, a permanent magnet is located at one end of the movable gripper and in the magnetic field of a plurality of actuating coils. Linear motion is imparted to the rod bundle by accelerating the movable gripper up and down through a short stroke by means of an external magnetic field applied to the permanent magnet which alters the flux pattern produced by the permanent magnet and, thus, causes reciprocation of the gripper and the linear element carried thereby. Through use of the permanent magnet arrangement a simple A.C. power supply can be used to achieve the desired incremental linear motion.

The above and other objects and features of the invention will become apparent from the following detailed description taken in connection with the accompanying drawings which form a part of this specification, and in which:

FIG. 4 is a cross-sectional view of another embodiment of the invention employing a permanent magnet in the actuating device of the linear element;

FIG. 5 is a cross-sectional view taken substantially along line V—V of FIG. 4; and FIGS. 6 and 7 schematically illustrate the flux paths produced in the permanent magnet shown in FIGS. 4 and 5 during every other half cycle of an alternating current applied to the actuating coils surrounding the permanent magnet.

Figure 2:
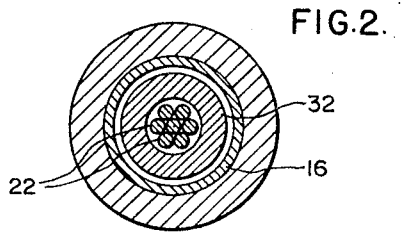
FIG. 2 is a cross-sectional view taken substantially along line II—II of FIG. 1.
Figure 1:
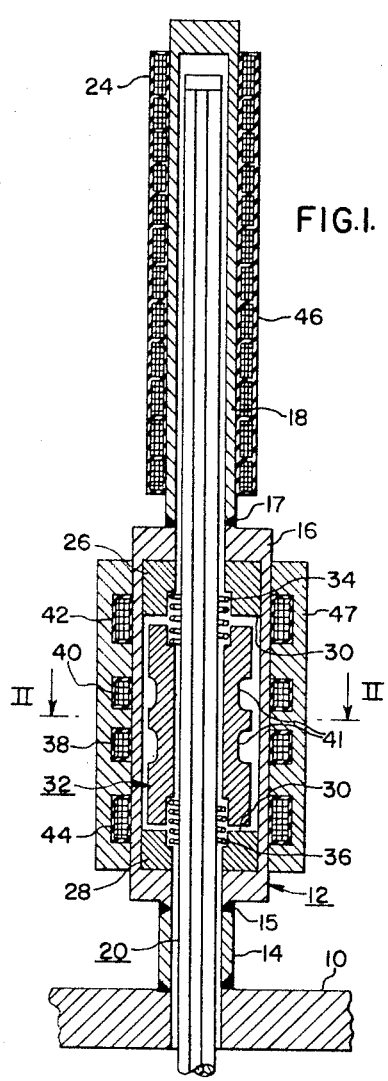
FIGURE 1 is an elevational cross-sectional view of one embodiment of the invention.

Referring now to the drawings, and particularly to FIG. 1, the linear motion device shown is particularly adapted for use in an atomic reactor, the pressure vessel thereof being generally indicated at 10. Projecting upwardly from the vessel 10 is a cylindrical member 12 having a lower reduced diameter nonmagnetic portion 14 communicating with an intermediate magnetically permeable portion 16 and secured thereto by an annular weld 15. Above the portion 16 is a nonmagnetic communicating portion 18 of smaller diameter substantially equal to that of portion 14 and secured to portion 16 by weld 17. Passing through the cylindrical cavity 12 is a linear element 20 which, as best shown in FIG. 2, comprises a bundle of parallel rods 22 secured at their upper ends by means of a cap, generally indicated at 24 in FIG. 1.

At opposite ends of the cylindrical portion 16 are magnetic pole pieces 26 and 28 which form abutments 30 formed from magnetically permeable material at opposite ends of a linear actuating device, generally indicated at 32. As shown, the linear actuating device 32 is generally cylindrical in configuration and surrounds the linear element 20 comprising the bundle of rods 22. Interposed between the actuating device 32 and the pole pieces 26 and 28 are coil springs 34 and 36 which serve to normally urge the actuating device into a central, null position intermediate the pole pieces 26 and 28 and the abutments 30 formed thereby. In this central or null position, it will be noted that clearances are provided between opposite ends of the actuating device 32 and the abutments 30.

Surrounding the portion 16 intermediate the ends of the actuating device 32 are a pair of gripper coils 38 and 40. These coils, when energized, will cause the rods 22 of linear element 20 to expand radially outwardly. In this manner they are held in what might be termed "sliding frictional engagement" with the inner periphery of the cylindrical actuating device 32, meaning that the element 20 can slide within device 32 under inertial forces sufficient to overcome the friction between the element 20 and the rods 22. To assist in creating the desired flux path from coils 38 and 40 through actuating device 32 to element 20, a pair of circumferential grooves 41 are formed in the outer surface of actuating device 32 and positioned in juxtaposed relationship to coils 38 and 40.

At one end of the actuating device 32, and spanning the gap between parts 32 and 26, is an electromagnetic lift coil 42. Similarly, a pull-down coil 44 spans the gap between the lower end of the actuating device 32 and pole piece 28. Surrounding the uppermost cylindrical cavity portion 18 is an indicator coil assembly 46 which may be used, in combination with external circuitry, not shown, to indicate the vertical position of the linear element 20. The assembly is completed by a coil housing 47 of magnetically permeable material. The coil housing 47 has annular slots therein which receive the coils 38, 40, 42 and 44 and provides low reluctance magnetic paths for the lines of flux produced by those coils.

The operation, assuming that a lifting motion is required, the gripper coils 38 and 40 are energized and remain energized at all times unless a "scram" function is required, "scram" being that condition wherein the linear element 20 must be moved quickly through a relatively long distance. Assuming that the gripper coils 38 and 40 are energized, the lift coil 42 is intermittently energized to lift the actuating device 32 against the upper abutment 30 on pole piece 26. This will cause the linear element 20 to slip in the direction of motion, which in this case is upwardly. The lift coil is thereafter deenergized and the actuating device is returned to its null position by the springs 34 and 36 without slip. If the upward motion of the linear element is, for example, 0.024 inch, a slip of 0.008 inch can be obtained by proper adjustment of the magnetic force and spring system. The time that the lift coil 42 is energized can be approximately 0.033 second, and deenergized for approximately 0.033 second. This provides fifteen steps per second, or nine hundred steps per minute which, at 0.008 inch per step is a rate of 7.2 inches per minute. It will be appreciated, therefore, that the net incremental movement of the rod bundle 22 upwardly is effected by inertial forces which cause slip between the rods 22 and the actuating device 32 as the device 32 strikes the abutment 30.

To lower the linear element 20, the pull-down coil 44 is energized intermittently in the same manner as the lift coil described above, with the actuating device 32 striking abutment 30 formed in pole piece 28 to cause a downward slip of the element 20. To effect a "scram" function, the movable gripper coils 38 and 40 are deenergized and the linear element moves rapidly downwardly under the influence of gravity.

Figure 3:
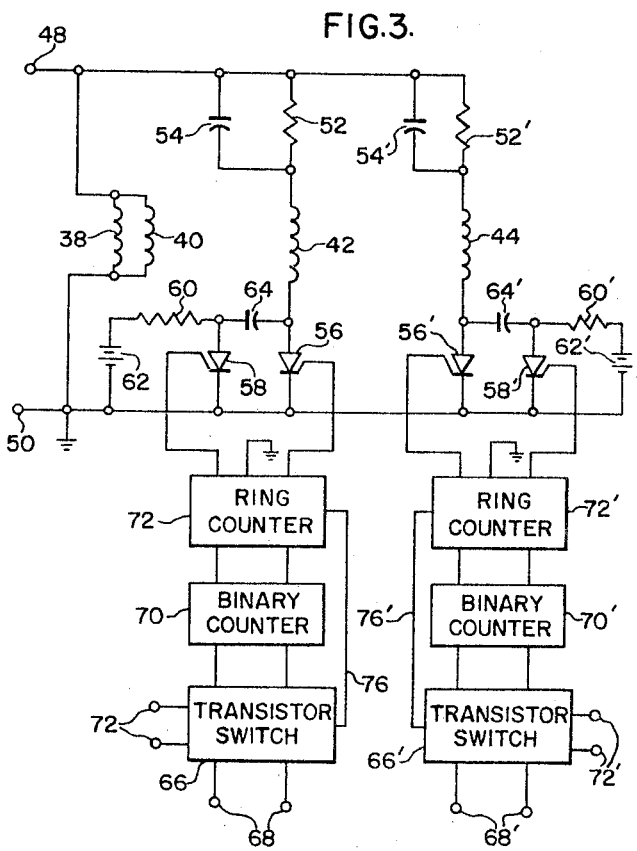
FIG. 3 is a schematic circuit diagram of one type of actuating circuit for the linear actuating device of FIG. 1.

One type of power supply which can be used in the system of FIG. 1 is shown in FIG. 3. The power supply for the gripper coils 38 and 40 may be a source of rectified alternating current voltage, not shown, applied to input terminal 48 and 50. The aforesaid rectified alternating current voltage is also used to energize the lifting and pull-down coils 42 and 44, respectively. As shown, one end of the coil 42 is connected to terminal 48 through the resistor-capacitor combination 52, 54. The other end of coil 42 is connected to terminal 50 through three parallel current paths, one of which includes a first transistor diode switch 56, the other of which includes a second transistor diode switch 58, and the third of which includes the series combination of a resistor 60 and source of voltage, such as battery 62. A capacitor 64 is utilized to interconnect the anodes of diodes 56 and 58, substantially as shown.

The diodes 56 and 58 are controlled by circuitry including a transistor switch 66 connected to a source of 60-cycle alternating current voltage through input terminals 68. The transistor switch 66 will be closed to apply the 60-cycle alternating current voltage to a binary counter 70 when an "up" signal is applied to input terminals 72 of switch 66.

When an "up" signal is applied to terminals 72, a 60-cycle alternating current voltage is fed into the binary counter 70 through switch 66. The binary counter 70, in turn, produces output pulses which are applied to a ring counter 74 at the rate of thirty pulses per second. The ring counter 74, connected to both of the diodes 56 and 58, turns on diode 56 with the first pulse. The second pulse turns on diode 58 and at the same time turns off diode 56. The lifting coil 42 is, therefore, energized during the first two cycles of the voltage applied to terminals 68 and deenergized for the next two cycles, after which the coil 42 is again energized. When the "up" signal is removed from the terminals 72, the transistor switch 66 is opened. At this time, the switch 66 applies a signal through lead 76 to the ring counter 74 to reset it whereby it maintains diode 58 energized. This, in turn, maintains the lifting coil 42 deenergized.

The circuit for pull-down coil 44 is the same as that for the lifting coil 42; and, accordingly, elements associated with coil 44 which correspond to those for coil 42 are identified by like, primed reference numerals. The pull-down coil will, of course, be energized only so long as a down signal is applied to terminals 72'. In either case, the coil 42 or 44 will be periodically energized for approximately 0.033 second and deenergized for approximately 0.033 second to effect the cycle of operation described above.

Referring now to FIGS. 4 and 5, another embodiment of the invention is shown wherein the linear element 78 again comprises a bundle of rods 80 (FIG. 5) having their ends secured together by means of a cap 82. The linear element 78 is hermetically sealed within a nonmagnetic outer casing 84 which carries, at its lower portion, an enlarged diameter magnetically permeable section 86 which houses the major portion of a linear actuating device 87, hereinafter described, and which is secured to casing 84 by an annular weld 85.

The linear actuating device itself comprises a magnetically permeable tubular element 88 extending upwardly from the enlarged diameter section 86 and having welded to its lower end a doughnut-shaped permanent magnet 90, the magnet being magnetized along the axis of linear element 78 with the polarity shown. Magnet 90 is movable axially relative to element 78 between spaced housing abutments 118 and 119. Positioned adjacent the lower end of the permanent magnet 90 is a short separate tubular member 92 which, at its lower end, carries a thickened annular section 94 of magnetically permeable material. Finally, between the member 94 and an abutment or shoulder 96 formed in section 86 is a spring washer 98 which tends to force upwardly the entire actuating device 87, which includes elements 88 and 90 and member 92 as viewed in FIG. 4.

Surrounding the tubular portion 88 of the actuating device 87 are a plurality of axially-spaced gripper coils 102 energized from a source of direct current voltage 104 through a variable resistor 106. With this arrangement, it will be appreciated that when the coils 102 are energized from source 104, the rods 80 of linear element 78 will be expanded radially outwardly to frictionally engage the inner surface of the tubular element 88, the amount of radial force on the rods 80 and, hence, the amount of frictional resistance being determined by the positioning of the variable resistor 106.

As best shown in FIG. 5, the permanent magnet 90 is surrounded by four E-shaped pole pieces 108, each of which has an annular actuating coil 110 mounted thereon surrounding the central leg of the E about an axis extending perpendicular to the axis of the linear element 78. Finally, a reversing coil 112 surrounds the doughnut-shaped member 94 of actuating device 87 and is adapted to be energized from a source of direct current voltage 114 by closure of switch 116. With the arrangement shown, it will be appreciated that the actuating device 87 can reciprocate between a first position wherein the washer 98 is in engagement with abutment 96 and wherein magnet 90 engages abutment 119 and a second position wherein the upper surface of the permanent magnet 90 is in engagement with an abutment 119 formed in the enlarged diameter section 86. In this respect, it will be appreciated that operation of the device pursuant to inertial principles wherein the bundle 78 slides within sleeve 88 in the direction of movement of sleeve 88 is similar to that already shown in connection with FIGS. 1 and 2.

As shown in FIG. 4, surrounding coils 102 is a sleeve 103 of magnetically permeable material, such as iron. A similar sleeve 113 surounds coil 112, the purpose of both sleeves being to provide low reluctance paths for the lines of flux produced by the respective coils.

The operation of the embodiment of the invention shown in FIGS. 4 and 5 may best be understood by reference to FIGS. 6 and 7. In accordance with the invention, reciprocating motion of the actuating device 87 between abutments 118 and 119 is generated by a conventional 115-volt alternating current power source, schematically illustrated at 120 in FIG. 4 and connected to all of the coils 110 in parallel. The alternating current in the four actuating coils 110, together with the permanent magnet 90, perform the dual function of both accelerating the actuating device 87 and switching the flux paths therethrough. As will be understood, various combinations of accelerations and step lengths can be applied to utilize the reciprocating motion of the gripper.

One such method which results in linear motion of the rod bundle is as follows: When the alternating current from source 120 is in the positive half of its cycle 124, the flux paths 126 of the actuating coils add to that maintained by the permanent magnet as shown in FIG. 6. Under these circumstances, assuming that the upward magnetic forces of magnet 90 and coils 110 equals 3 G's, the upward spring force equals 3 G's and the downward gravitational force equals 1 G, the combined forces of magnet 90, coils 110 and the spring washer 98 accelerate the actuating device 87 upward to the position shown in FIG. 6 with a net upward acceleration of 5 G's. In this process, the actuating device 87 raises, for example, 1/64 inch and strikes the abutment 118, whereupon the inertia of the linear element 78 causes it to slide upwardly, relative to the actuating device 87, through approximately 0.008 inch, dependent upon the lines of force generated by coil bank 102 as determined by the position of rheostat 106.

When the alternating current is in the negative half of its cycle 128 as shown in FIG. 7, the flux 130 from the actuating coils 100 and the permanent magnet 90 changes as shown. The combined downward forces of coils 110 and magnet 90 (3 G's) and the gravitational force (1 G) against the upward force of spring washer 98 (3 G's) will accelerate the movable actuating device 87 downward with lesser force (1 G). The gripper, therefore, lowers 1/64 inch and strikes the abutment 119; while the inertia of the linear element 78 causes it to slide downward, relative to the actuating device 87, through approximately 0.003 inch. The net movement of the rod bundle is, therefore, 0.005 inch upward which gives a rate of travel of eighteen inches per minute for a 60-cycle per second exciting current applied to the coils 110, as is available from conventional power generating equipment. As the actuating device 87 moves up and down, the magnetic flux follows the path of least reluctance and swings back and forth between the paths 126 and 130 shown in FIGS. 6 and 7. Note that both flux paths of the actuating coils 110 maintain the magnetization of the permanent magnet 90. The paths are always in the same direction in the permanent magnet even though the current changes direction in the coils.

The linear element 78 is reversed by closing switch 116 to energize reversing coil 112. This pulls the doughnut-shaped section 94 and integral sleeve member 92 downwardly to nullify the upward force (3 G's) effected by the spring washer 98. The acceleration downward (1 G from gravity and 3 G's from magnet 90 and coils 110) then exceeds the acceleration upward (3 G's from magnet 90 and coils 110) and the linear element 78 lowers as the gripper reciprocates with a net downward acceleration of 1 G. Speed control is achieved by changing the magnetomotive force of coils 102 with the rheostat 106 as in the previous case.

The motion provided by the linear motion device of FIGS. 4 and 5 is essentially stepless. That is, the small incremental movement of 0.008 inch of the rod bundle, occurring every 1/60 second, closely approaches a continuous displacement function. This characteristic makes the actuator especially applicable to high flux nuclear reactor cores where close control rod control is a requisite. In addition, a conventional 60-cycle A.C. source may be used to effect movement of the movable element rather than the complex A.C. or rectified A.C. sources for other mechanisms.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. In a linear motion device, the combination of a linearly movable element, means comprising a single cylindrical linear actuating device surrounding said linear element and movable along the axis of the linear element between stationary abutments, means for effecting frictional engagement between the linear element and the inner periphery of said actuating device, and means for selectively and intermittently driving said actuating device and the linear element in frictional engagement therewith into engagement with at least one of said abutments to effect relative sliding movement of the linear element within the actuating device under the force of inertia.

2. In a linear motion device, the combination of a linearly movable element, a cylindrical linear actuating device surrounding said linear element and movable along the axis of the linear element between stationary abutments, means for effecting sliding frictional engagement between the linear element and at least a portion of the inner periphery of said actuating device, means for urging said actuating device into a predetermined null position between said abutments, means for selectively and intermittently driving said actuating device and the linear element in frictional engagement therewith into engagement with a least one of said abutments to effect sliding movement of the linear element relative to the actuating device under the force of inertia.

3. In a linear motion device, the combination of a linear element comprising a bundle of rods of magnetically permeable material which can be expanded radially outwardly under the influence of a magnetic field, a cylindrical linear actuating device surrounding said linear element and movable along the axis of the linear element between stationary abutments, resilient means interposed between at least one of said stationary abutments and an end of the actuating device for urging the actuating device into a predetermined null position, gripper coil means surrounding said linear actuating device for expanding the rods of said linear element radially outwardly into frictional engagement with the inner periphery of the cylindrical actuating device, means for driving said actuating device against one of said abutments whereby the inertia of the linear element will cause it to slide within the actuating device to effect a net incremental movement of the linear element relative to the actuating device in one direction along its axis, and means for driving said actuating device against the other of said abutments whereby the inertia of the linear element will cause it to slide within the actuating device to effect a net incremental movement of the linear element relative to the actuating device in the other direction along its axis.

4. In a linear motion device, the combination of a linear element comprising a bundle of rods of magnetically permeable material which can be expanded radially outwardly under the influence of a magnetic field, a cylindrical linear actuating device surrounding said linear element and movable along the axis of the linear element between stationary abutments, spring means interposed between at least one of said stationary abutments and an end of the actuating device for urging the actuating device into a predetermined null position, gripper coil means surrounding said linear actuating device for expanding the rods of said linear element radially outwardly into frictional engagement with the inner periphery of the cylindrical actuating device, means for intermittently driving said actuating device against one of said abutments whereby the inertia of the linear element will cause it to slide within the actuating device to effect a net incremental movement of the linear element relative to the actuating device in one direction along its axis each time the actuating device is driven against said one abutment, and means for intermittently driving said actuating device against the other of said abutments whereby the inertia of the linear element will cause it to slide within the actuating device to effect a net incremental movement of the linear element relative to the actuating device in the other direction along its axis each time the actuating device is driven against said other abutment.

5. In a linear motion device, the combination of a linear element comprising a bundle of rods of magnetically permeable material which can be expanded radially outwardly under the influence of a magnetic field, a cylindrical linear actuating device surrounding said linear element and movable along the axis of the linear element between stationary abutments, spring means interposed between at least one of said stationary abutments and an end of the actuating device for urging the actuating device into a predetermined null position, gripper coil means surrounding said linear actuating device for expanding the rods of said linear element radially outwardly into frictional engagement with the inner periphery of the cylindrical actuating device, first actuating coil means surrounding said actuating device, second actuating coil means surrounding said actuating device and spaced from said first coil means, circuit means for intermittently energizing said first coil means to intermittently drive the actuating device against one of said abutments whereby the inertia of the linear element will cause it to slide within the actuating device to effect a net incremental movement of the linear element relative to the actuating device in one direction along its axis each time the first coil means is energized, and circuit means for intermittently energizing said second coil means to intermittently drive the actuating device against the other of said abutments whereby the inertia of the linear element will cause it to slide within the actuating device and effect a net incremental movement of the linear element relative to the actuating device in the other direction along its axis each time the second coil means is energized.

6. In a linear motion device, the combination of a linear element comprising a bundle of rods of magnetically permeable material which can be expanded radially outwardly under the influence of a magnetic field, a cylindrical linear actuating device surrounding said linear element and movable along the axis of the linear element between stationary abutments, resilient means interposed between the stationary abutments and opposite ends of the actuating device for urging the actuating device into a central null position intermediate the abutments, gripper coil means surrounding said linear actuating device for expanding the rods of said linear element radially outwardly into frictional engagement with the inner periphery of the cylindrical actuating device, means for driving said actuating device against one of said abutments whereby the inertia of the linear element will cause it to slide within the actuating device and effect a net incremental movement of the linear element relative to the actuating device in one direction along its axis when the actuating element is returned to its null position by the resilient means, and means for driving said actuating element against the other of said abutments whereby the inertia of the linear element will cause it to slide within the actuating device to effect a net incremental movement of the linear element relative to the actuating device in the other direcion along its axis when the actuating element is returned to its null position by the resilient means.

7. In a linear motion device, the combination of a linear element comprising a bundle of rods of magnetically permeable material which can be expanded radially outwardly under the influence of a magnetic field, a cylindrical linear actuating device surrounding said linear element and movable long the axis of the linear element between stationary abutments, coil springs interposed between the stationary abutments and opposite ends of the actuating device for urging the actuating device into a central null position intermediate the abutments, gripper coil means surrounding said linear actuating device for expanding the rods of said linear element radially outwardly into frictional engagement with the inner periphery of the cylindrical actuating device, first actuating coil means at one end of said actuating device, second actuating coil means at the other end of said actuating device, first circuit means for intermittently energizing said first actuating coil means to intermittently drive the actuating device against one of said abutments whereby the inertia of the linear element will cause the linear element to slide within the actuating device to effect a net incremental movement of the linear element relative to the actuating device in one direction along its axis when the actuating device is returned to its null position by the coil springs, and means for intermittently energizing said second coil means to intermittently drive said actuating device against the other of said abutments whereby the inertia of the linear element will cause it to slide relative to the actuating device and effect a net incremental movement of the linear element in the other direction along its axis when the actuating device is returned to its null position by the coil springs.

8. The combination of claim 7 wherein said linear actuating device is formed from magnetically permeable material, wherein said abutments are also formed of magnetically permeable material, and wherein said first and second actuating coil means each span the gap between the actuating device and an associated one of said abutments when the actuating device is in its null position.

9. In a linear motion device, the combination of a linear element comprising a bundle of rods of magnetically permeable material which can be expanded radially outwardly under the influence of a magnetic field, a cylindrical linear actuating device surrounding said linear element and movable along the axis of the linear element between stationary abutments, said actuating device being formed from magnetically permeable material, means for expanding said rods radially outwardly into frictional engagement with the inner peripheral surface of said actuating device, means for urging the actuating device into a predetermined null position, permanent magnet means carried on the actuating device, electromagnetic coil means in close proximity to said permanent magnet means, and circuit means for applying an alternating current to said coil means to vary the flux pattern produced by the permanent magnet means to thereby reciprocate the actuating device between said stationary abutments.

10. In a linear motion device, the combination of a linear element comprising a bundle of rods of magnetically permeable material which can be expanded radially outwardly under the influence of a magnetic field, a cylindrical linear actuating device surrounding said linear element and movable along the axis of the linear element between stationary abutments said actuating device being formed from magnetically permeable material, means for urging the actuating device into a predetermined null position, permanent magnet means carried on the actuating device, electromagnetic coil means in close proximity to said permanent magnet means, circuit means for applying an alternating current to said coil means to vary the flux pattern produced by the permanent magnet means to thereby reciprocate the actuating device between said stationary abutments, electromagnetic gripper coil means surrounding said actuating device and spaced from said permanent magnet means, and means for applying current to said gripper coil means for expanding the rods of said bundle radially outwardly into frictional engagement with the inner periphery of the cylindrical actuating device.

11. The combination of claim 10 and including means for varying the magnitude of said current to thereby vary the frictional resistance between the bundle of rods and said linear actuating device.

12. In a linear motion device, the combination of a linear element comprising a bundle of rods of magnetically permeable material which can be expanded radially outwardly under the influence of a magnetic field, a cylindrical linear actuating device surrounding said linear element and movable along the axis of the linear element between stationary abutments, said actuating device being formed from magnetically permeable material, means for urging the actuating device into a predetermined null position, electromagnetic gripper coil means surrounding said actuating device, means for applying a direct current to said gripper coil means for expanding the rods of said bundle radially outwardly to frictional engagement with the inner periphery of the cylindrical actuating device, cylindrical permanent magnet means on the actuating device surrounding the linear element and spaced from said gripper coil means, said permanent magnet means being magnetized to form north and south poles at its opposite ends along the axis of said linear element, a plurality of electromagnetic coils circumferentially spaced around said permanent magnet means and having axes extending perpendicular to the axis of said linear element, and means for applying an alternating current to all of said electromagnetic coils to thereby vary the flux pattern produced by the permanent magnet means and reciprocate the actuating device between said stationary abutments.

13. In a linear motion device, the combination of a linear element comprising a bundle of rods of magnetically permeable material which can be expanded radially outwardly under the influence of a magnetic field, a cylindrical linear actuating device surrounding said linear element and movable along the axis of the linear element between stationary abutments, said actuating device being formed from magnetically permeable material, spring means interposed between one end of the actuating device and one of said abutments for urging the actuating device into a predetermined null position, electromagnetic gripper coil means surrounding said actuating device, means for applying a direct current to said gripper coil means for expanding the rods of said bundle radially outwardly into frictional engagement with the inner periphery of the cylindrical actuating device, permanent magnet means carried on the actuating device and spaced from said gripper coil means, electromagnetic coil means in close proximity to said permanent magnet means, and circuit means for applying an alternating current to said coil means to vary the flux pattern produced by the permanent magnet means to thereby reciprocate the actuating device between said stationary abutments, the arrangement being such that the spring means interposed between one end of the actuating device and one of said abutments will assist in moving the actuating device in one direction while resisting movement of the actuating device in the opposite direction whereby the net movement of the linear element within the actuating device by sliding movement due to inertial forces will be in said one direction.

14. The combination of claim 13 and including an electromagnetic reversing coil surrounding said one end of said actuating device and its associated abutment, and means for energizing said reversing coil to thereby attract the actuating device toward said last-mentioned abutment and thereby nullify the effect of said spring means, the arrangement being such that when the actuating device is reciprocated by the application of an alternating current to said coil means, the net movement of the linear element by sliding within the actuating device due to inertial forces will be in said opposite direction.

15. A motive device comprising, a driven member mounted for reciprocal movement, an actuating member also mounted for reciprocal movement adjacent said driven member, spaced fixed abutments mounted in the path of movement of said actuating member for limiting movement thereof, means for frictionally coupling said actuating and driven members for limited movement together, biasing means for normally maintaining said actuating member at one position spaced from at least one of said abutments, and means for intermittently driving said actuating device in a direction toward said one abutment with a force such that a predetermined overtravel of said driven member occurs due to its kinetic inertia beyond the point where said actuating member engages said one abutment.

References Cited

UNITED STATES PATENTS 2,803,761    8/1957    Young _____ 310—14
2,831,990    4/1958    Young _____ 310—14

FOREIGN PATENTS 155,217    12/1963    U.S.S.R.

J D MILLER, *Primary Examiner.*

D. E. DUGGAN, *Assistant Examiner.*

U.S. Cl. X.R.

318—135